US011748134B2

(12) United States Patent
Cherivirala et al.

(10) Patent No.: US 11,748,134 B2
(45) Date of Patent: Sep. 5, 2023

(54) INFERENCE ENGINE FOR CONFIGURATION PARAMETERS IN A NETWORK FUNCTIONS VIRTUALIZATION ORCHESTRATOR

(71) Applicant: VMWARE, INC., Palo Alto, CA (US)

(72) Inventors: Kiran Kumar Cherivirala, Bangalore (IN); Sachin Thakkar, Palo Alto, CA (US); Sachin Bendigeri, Bangalore (IN); Umar Shaikh, Bangalore (IN); Sureshbabu Koyadan Chathoth, Bangalore (IN); Sujeet Banerjee, Bangalore (IN); Venkata Vanaja Lakshmi Yakkala, Bangalore (IN)

(73) Assignee: VMware, Inc., Palo Alto, CA (US)

(*) Notice: Subject to any disclaimer, the term of this patent is extended or adjusted under 35 U.S.C. 154(b) by 486 days.

(21) Appl. No.: 16/938,944

(22) Filed: Jul. 25, 2020

(65) Prior Publication Data

US 2021/0357245 A1 Nov. 18, 2021

(30) Foreign Application Priority Data

May 18, 2020 (IN) .............................. 202041020874

(51) Int. Cl.
*G06F 9/455* (2018.01)
*G06N 5/04* (2023.01)
(Continued)

(52) U.S. Cl.
CPC ........... *G06F 9/45558* (2013.01); *G06N 5/04* (2013.01); *G06N 20/00* (2019.01);
(Continued)

(58) Field of Classification Search
CPC ......... G06F 9/45558; G06F 2009/4557; G06F 2009/45595; G06N 20/00; G06N 5/04;
(Continued)

(56) References Cited

U.S. PATENT DOCUMENTS

2019/0280920 A1* 9/2019 Wang ...................... G06F 9/455
2020/0162323 A1* 5/2020 Abu Lebdeh ....... H04L 41/0806
2021/0144517 A1* 5/2021 Guim Bernat ........ H04L 9/0637

OTHER PUBLICATIONS

ETSI, "Network Functions Virtualisation (NFV) Release 3; Architecture; Report on the Enhancements of the NFV architecture towards 'Cloud-native' and 'PaaS'," ETSI GR NFV-IFA 029 V3.3.1, Nov. 2019, 84 pages.

(Continued)

*Primary Examiner* — Jacob D Dascomb
(74) *Attorney, Agent, or Firm* — Kim & Stewart LLP

(57) ABSTRACT

A system and method for deploying a virtual network function (VNF) are disclosed. Deploying a VNF includes receiving a request to instantiate a VNF in a network virtualization infrastructure, obtaining input from a user providing parameters needed for performing the instantiation of the VNF, determining a type of deployment for the VNF, and adding parameters inferred from the type of deployment to the user data to complete the parameters needed for deployment of the VNF, wherein the added parameters are inferred based on stored data regarding previous instantiations of the VNF. Determining the type of deployment for the VNF includes determining a number of instances of the VNFs to be deployed and a number of virtual infrastructure managers that will be instructed to deploy resources needed by the VNF.

20 Claims, 15 Drawing Sheets

(51) Int. Cl.
*G06N 20/00* (2019.01)
*H04L 67/1097* (2022.01)
*H04L 69/28* (2022.01)
*H04L 61/4511* (2022.01)

(52) U.S. Cl.
CPC .............. *G06F 2009/4557* (2013.01); *G06F 2009/45595* (2013.01); *H04L 61/4511* (2022.05); *H04L 67/1097* (2013.01); *H04L 69/28* (2013.01)

(58) Field of Classification Search
CPC ... H04L 61/4511; H04L 67/1097; H04L 69/28
See application file for complete search history.

(56) References Cited

OTHER PUBLICATIONS

ETSI, "Network Functions Virtualisation (NFV) Release 4; Management and Orchestration; Requirements for service interfaces and object model for OS container management and orchestration specification," ETSI GS NFV-IFA 040 V4.2.1, May 2021, 20 pages.
Ersue, M. "ETSI NFV Management and Orchestration—An Overview," IETF #88, Vancouver, Canada, Nov. 3, 2013, 14 pages.
Nguyenphu, T. et al. "VNF Descriptor (VNFD) Overview," ETSI 2018, Oct. 8, 2018, 34 pages.
VMware, Inc. "Creating a VMware vCloud NFV Platform," Reference Architecture, Version 1.5, 2015, 40 pages.
VMware, Inc. "Network Functions Virtualization," VMware vCloud NFV Product Documentation, May 31, 2019, 2 pages, URL: https://docs.vmware.com/en/VMware-vCloud-NFV/2.0/vmware-vcloud-nfv-openstack-edition-ra20/GUID-FBEA6C6B-54D8-4A37-87B1-D825F9E0DBC7.html.

\* cited by examiner

INFERENCE ENGINE FOR CONFIGURATION PARAMETERS IN A NETWORK FUNCTIONS VIRTUALIZATION ORCHESTRATOR

RELATED APPLICATIONS

Benefit is claimed under 35 U.S.C. 119(a)-(d) to Foreign Application Serial No. 202041020874 filed in India entitled "INFERENCE ENGINE FOR CONFIGURATION PARAMETERS IN A NETWORK FUNCTIONS VIRTUALIZATION ORCHESTRATOR", on May 18, 2020, by VMware, Inc., which is herein incorporated in its entirety by reference for all purposes.

BACKGROUND

Virtualization encompasses a wide range of technologies for managing computing resources, providing a software translation layer, also called a virtualization layer, between the software and the physical hardware. Network functions virtualization (NFV), defined by a European Telecommunications Standards Institute (ETSI) standard, is an application of virtualization to network-based devices, which include network function devices, network-related compute-devices and network-attached storage. Network function devices include switches, routers, network access points, customer premises equipment, and deep packet inspectors. Network-related compute-devices include firewalls, load balancers, instruction detection systems and network management systems. Network-attached storage includes file and database servers attached to the network. A virtualized network function (VNF), also defined by the standard, is the building block that is used to implement the network functions and network-related functions.

FIG. 1 depicts a reference architecture for NFV, which includes three domains of operation, an NFV infrastructure (NFVI) 104, VNFs and Managers 102, which includes a set of VNFs 122$_{1-N}$ and a set of corresponding element management systems (EMS) 120$_{1-N}$, and an NFV management and organization function (NFV_MANO) 106. NFVI 104 performs the virtualization on physical compute devices, physical storage devices and physical network devices and provides the infrastructure on which VNFs 122$_{1-N}$ run. NFV_MANO 106 supports the infrastructure virtualization and the lifecycle management of VNFs 122$_{1-N}$, where the lifecycle includes creation, VNF service chaining, monitoring, relocation, shutdown, and billing. NFV_MANO 106 includes three components, an Orchestrator (NFVO) 132, a set of VNF managers (VNFMs) 142$_{1-N}$, and at least one virtualized infrastructure manager (VIM) 144.

NFVO 132 operates using a number of repositories, (1) Network Services (NS) Catalog 134, (2) VNF Catalog 136, (3) NFV Instances 138, and (4) NFVI Resources 140. NS Catalog repository 134 contains a list of usable network services, each of which has a deployment template in terms of VNFs 122$_{1-N}$ and a description of its connectivity through virtual links. VNF catalog repository 136 contains a database of all useable VNF descriptors, where a descriptor describes a VNF in terms of its deployment and operational behavior requirements. Included in a descriptor is a portion called a VDU, which sets out the resources, such as virtual compute, storage, and networking, needed by the VNF. NFV Instances (NFV_I) repository 138 is a list containing details about network service instances and related VNF instances. Finally, NFVI resources (NFV_R) repository 140 is a list of NFVI resources utilized for the purpose of establishing NFV services.

There are several user input configuration parameters needed for instantiating a VNF by an NFV Orchestrator. Customers need to provide the user input parameters while managing the lifecycle of VNF, where the lifecycle includes operations like instantiate, Scale-out (Manual), Scale-out (Auto). Providing all the parameters when there are multiple instances of VNF to be deployed is error-prone. In the case of auto Scale-out, providing the input parameters is complex.

SUMMARY

One or more embodiments provide a method for deploying a virtual network function (VNF). The method includes receiving a request to instantiate a VNF in a network virtualization infrastructure, obtaining input from a user providing parameters needed for performing the instantiation of the VNF, determining a type of deployment for the VNF, and adding parameters inferred from the type of deployment to the user data to complete the parameters needed for deployment of the VNF, wherein the added parameters are inferred based on stored data regarding previous instantiations of the VNF. Determining the type of deployment for the VNF includes determining a number of instances of the VNFs to be deployed and a number of virtual infrastructure managers that will be instructed to deploy resources needed by the VNF.

Further embodiments include a computer system configured to carry out one or more aspects of the above method, and a non-transitory computer-readable storage medium containing computer-readable code executable by one or more computer processors to carry out one or more aspects of the above method.

DETAILED DESCRIPTION

One or more embodiments described herein provide for a less error-prone and more efficient manner of deploying VNFs in an NFVI by using a recommendation engine to provide common recurring parameters to the Orchestrator deploying the VNFs so that a user does not have to supply those recurring parameters.

Figure 1:
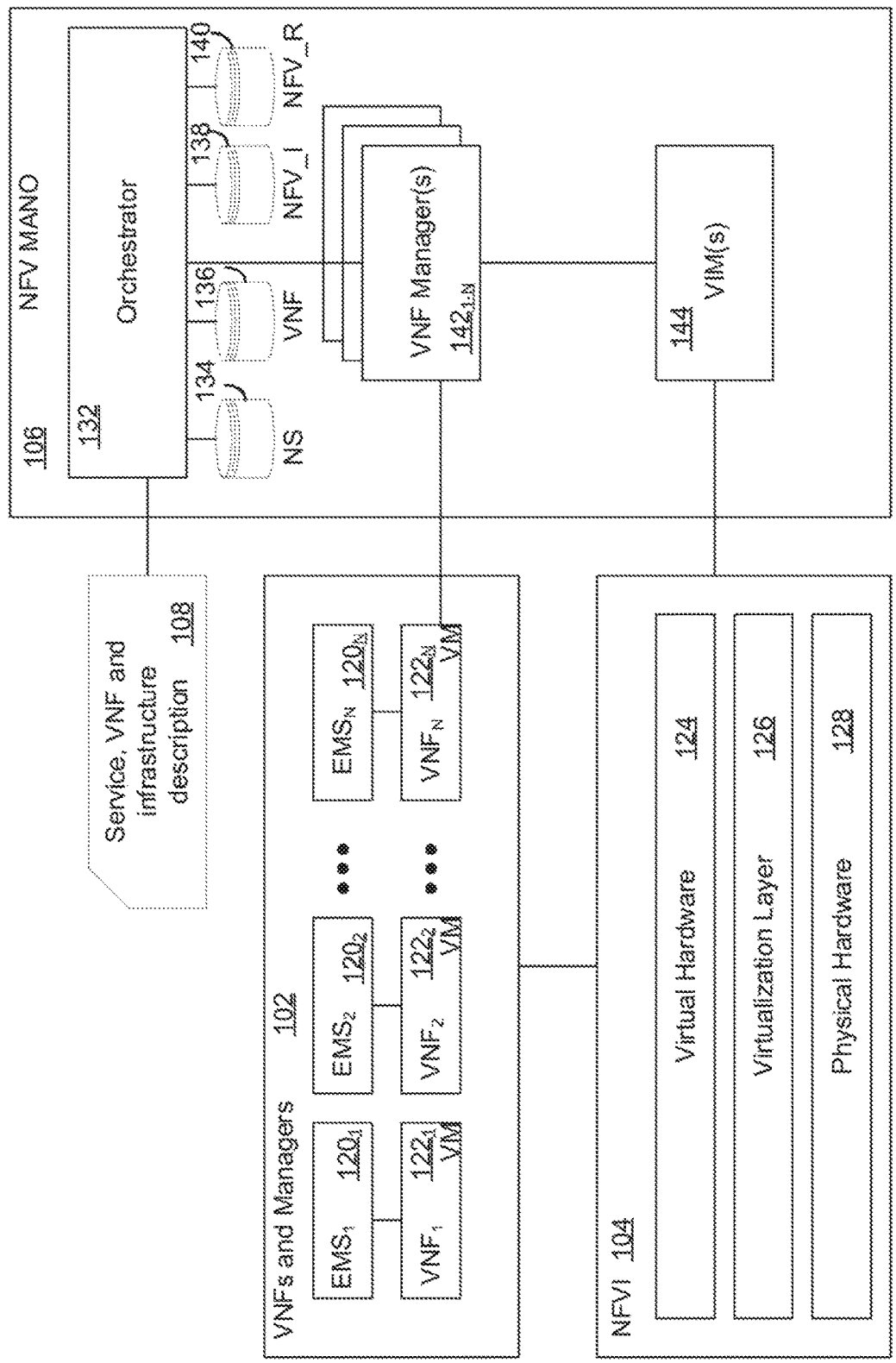
FIG. 1 depicts a reference architecture for network virtualization infrastructure (NVI).
Figure 2:
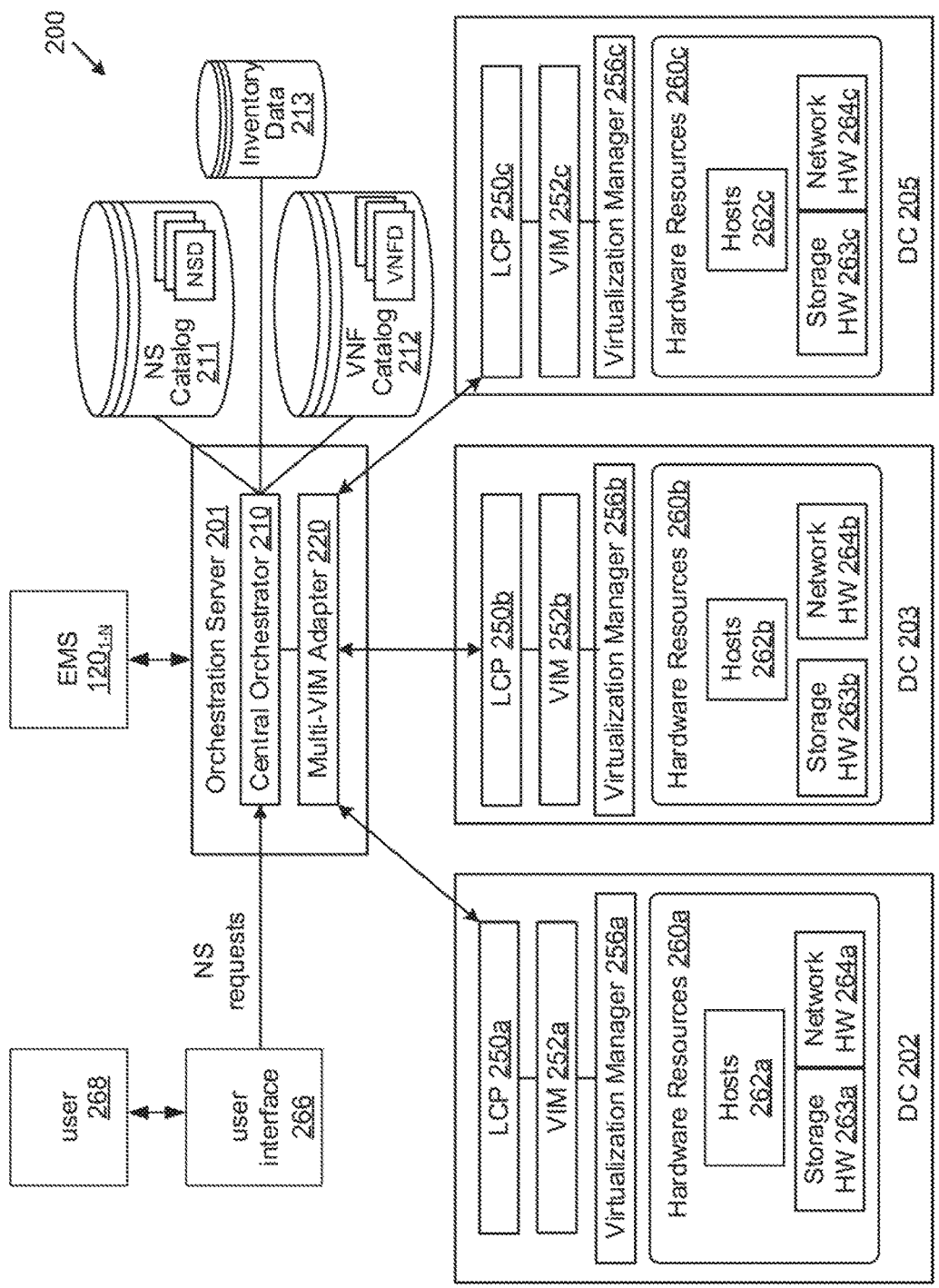
FIG. 2 is a block diagram of a network functions virtualization (NFV) platform according to an embodiment.

FIG. 2 is a block diagram of a network functions virtualization (NFV) platform according to an embodiment. The NFV platform, according to the embodiments, is depicted as NFV platform 200 and includes an Orchestration server 201 running the orchestration and management software and a user interface 266. Orchestration server 201 is connected to data center (DC) 202, data center (DC) 203, and data center (DC) 205 over a communications network.

Orchestration server 201 provides a main management interface for a network service provider and, as depicted, has two software modules running therein, a central orchestrator 210 and multi-VIM adapter 220. EMSs $120_{1-N}$ are coupled to orchestration server 201.

Central orchestrator 210 receives network service requests from user interface 266 and relies on several repositories, as mentioned above, configured in non-volatile storage devices, to carry out its orchestration tasks. The first repository is network service (NS) catalog 211, which stores network service descriptors for all of the different network services that can be provisioned or have been provisioned by NFV platform 200. The second repository is VNF catalog 212, in which VNF descriptors of VNFs from various vendors are stored. The third repository, illustrated in FIG. 2, is the one for inventory database 213.

A multi-VIM adapter 220 communicates with Central Orchestrator 210 to generate a set of generic commands to be issued to various, selected data centers (DC) 202, 203, 205.

Each data center (DC) 202, 203, 205 includes physical hardware resources 260a-260c, a virtualization manager 256a-256c, a VIM 252a-252c and a local control plane (LCP) 250a-250c.

Hardware resources 260a of DC 202 include hosts 262a, storage hardware 263a, and network hardware 264a. Hardware resources 260b, which include hosts 262b, storage hardware 263b and network hardware 264b, and hardware resources 260c, which includes hosts 262c, storage hardware 263c, and network hardware 264c, of DCs 203, 205, respectively, are similar to hardware resources 260a of DC 202.

Virtualization manager 256a is virtualization management software executed in a physical or virtual server that cooperates with hypervisors installed in hosts 262a to provision virtual compute, storage, and network resources, including virtual machines, from hardware resources 260a. Virtualization managers 256b, 256c are similar to virtualization manager 256a of DC 202.

VIM 252a is virtualized infrastructure manager, executed in a physical or virtual server, whose function is to partition the virtual compute, storage and network resources provisioned by virtualization manager 256a for different tenants. VIM 252a also exposes the functionality for managing the virtual compute, storage, and network resources, e.g., as a set of APIs, to local control plane (LCP) 250a. VIMs 252b, 252c are similar to VIM 252a of DC 202.

LCP 250a is a physical or virtual appliance that receives the set of generic commands from multi-VIM adapter 220 and translates these commands into API calls that recognizable by VIM 252a. LCPs 250b, 250c is similar to LCP 250a of DC 202.

According to embodiments, LCPs 250a, 250b, 250c of data centers DC 202, 203, 205 in combination with multi-VIM adapter 220 implement the functionality of multi-site virtual infrastructure orchestration of network services. As a result of decentralizing the virtual infrastructure orchestration of network services, VNFs can be deployed across thousands or even tens of thousands of these data centers.

Deploying VNFs

Each VNF that needs to be deployed to support a network service goes through an on-boarding phase. The on-boarding phase involves getting a VNF package from a vendor of the VNF. The VNF package includes a VNF descriptor (VNFD), a VNF manager, an element management system (EMS), and installing them in NFV platform 200.

VNFD is a file that describes the properties of the VNF, including resources needed, which resources are packaged in a virtual deployment unit (VDU) (e.g., amount and type of virtual compute, storage, and network resources), software metadata (e.g., software version of the VNF), connectivity descriptors for external connection points, internal virtual links and internal connection points, lifecycle management behavior (e.g., scaling and instantiation), supported lifecycle management operations and their operations, supported VNF specific parameters, and affinity/anti-affinity rules. As described above, VNFDs are stored in VNF catalog 212.

Virtualization managers 256a-c, shown in FIG. 2, are proprietary software that the VNF vendor has developed for deploying the VNF onto a conventional NFVI and are optionally provided in the embodiments so that they can be used to deploy the VNF onto a conventional NFVI. The EMS $120_1$ is also proprietary software that the VNF vendor has developed to manage the configuration of a VNF after a virtual machine for the VNF has been instantiated. The virtual machine communicates with an EMS $120_{1-N}$ to receive initial configuration parameters as well as configuration changes during the lifecycle of the VNF.

For each network service request that central orchestrator 210 receives, central Orchestrator 210 searches NS catalog 211 for a network service descriptor corresponding to the request. As mentioned, the network service descriptor contains identification information of all the VNFs that are used by the network service, network connectivity requirements for the VNFs, CPU utilization and other factors related to performance of each virtual machine on which a VNF is to be deployed, and specifications on when to heal the VNFs and when to scale the network service. Upon completing a successful search, central orchestrator 210 retrieves the network service descriptor from NS catalog 211 and extracts information it needs to carry out the request.

The information extracted from the network service descriptor includes identification information of all of the VNFs that are used by the network service. For all such VNFs, central orchestrator 210 retrieves into memory the corresponding VNF descriptor from VNF catalog 212 and parses the VNF descriptors to extract information it needs to carry out the request. In particular, central orchestrator 210 generates commands for multi-VIM adapter 220 based on the extracted information and issues the commands to multi-VIM adapter 220. Multi-VIM adapter 220 then generates a set of generic commands to be issued to the data centers.

The commands generated by multi-VIM adapter 220 are generic in that they do not have to comply with any particular format required by cloud computing management software running the different data centers.

Figure 3:
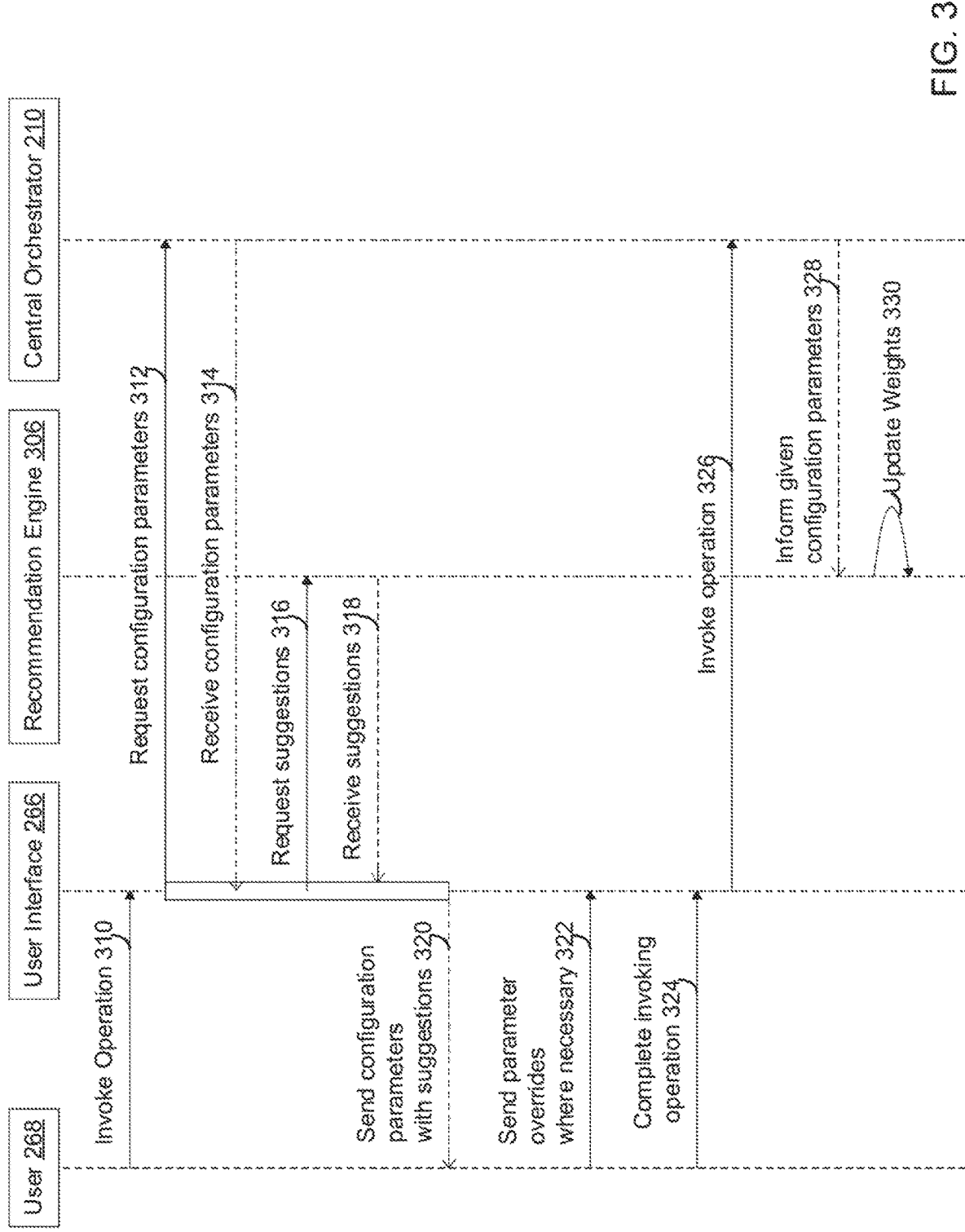
FIG. 3 depicts an interaction timeline for a user and a user interface for performing an invoked operation according to an embodiment.

FIG. 3 depicts an interaction timeline for a user and a user interface for performing an invocation operation, according to an embodiment. In step 310, a user 268 invokes an operation at a user interface 266. In step 312, user interface 266 requests configuration parameters from a central orchestrator 210. In step 314, central orchestrator 210 provides the configuration parameters to user interface 266. In step 316, user interface 266 requests suggestions for the parameters from a recommendation engine 306. In step 318, user interface 266 receives suggestions from recommendation engine 306. In step 320, user interface 266 provides user 268 with configuration parameters along with the suggestions. In step 322, user 268 sends the parameters along with possible overrides to user interface 266. In step 324, user 268 completes the invoking operation. In step 326, user interface 266 sends the invoking operation to central orchestrator 210. In step 328, central orchestrator 210 informs recommendation engine 306 of the configuration parameters used in the invocation. In step 330, recommendation engine 306 updates weights relating to the configuration parameters. Aspects of the interaction timeline, such as steps 316 and 318, are further described below.

Figure 4:
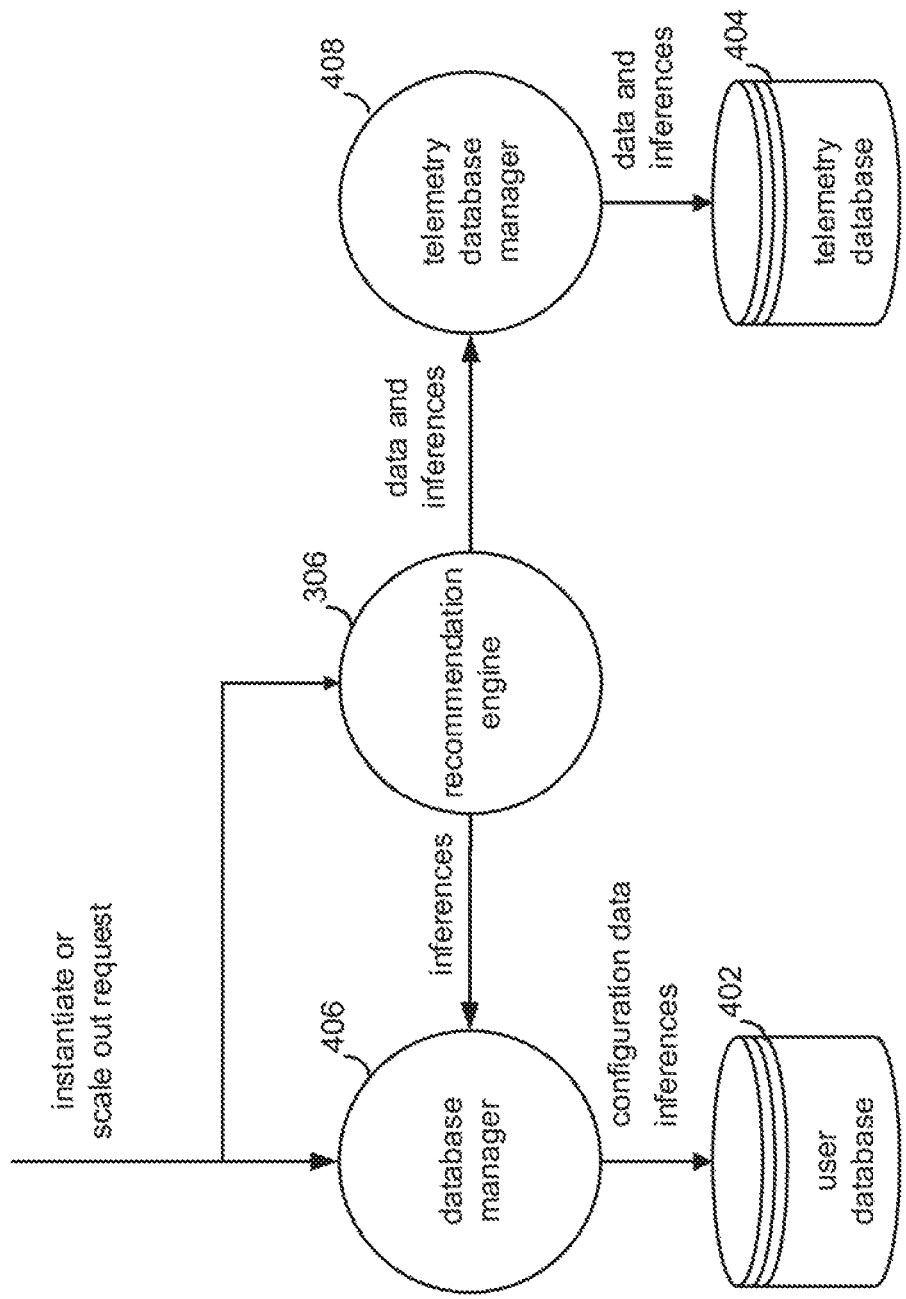
FIG. 4 depicts the recommendation engine and its relationship to the user database and the telemetry database managers, according to an embodiment.

FIG. 4 depicts the recommendation engine and its relationship to the user database and the telemetry database, according to an embodiment. User database 402 and telemetry database 404 operate as combined inventory database 213, as depicted in FIG. 2 and contain data regarding previous instantiations and deployments of VNFs. Recommendation engine 306 interacts with a database manager 406, which updates user database 402 and with a telemetry database manager 408, which updates telemetry database 404, as further described in reference to FIG. 5.

Figure 5:
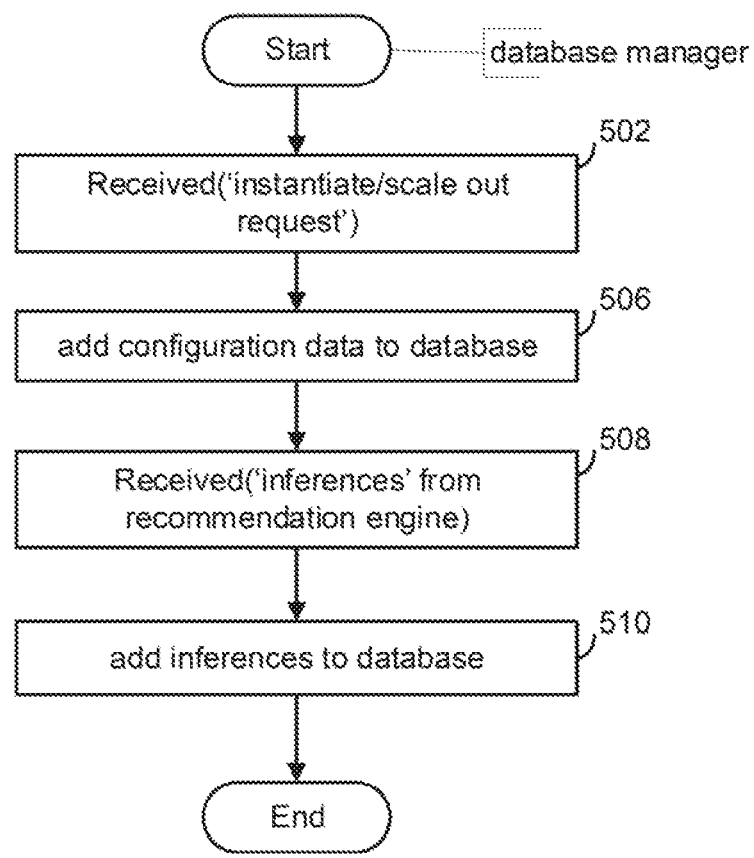
FIG. 5 depicts a flow of operations for the database manager, according to an embodiment.

FIG. 5 depicts a flow of operations for the database manager, according to an embodiment. In step 502, database manager 406 receives a request to instantiate or scale out a VNF. In step 506, database manager 406 adds configuration data to user database 402. In step 508, database manager 406 receives inferences from recommendation engine 306. In step 510, database manager 406 adds the inferences to user database 402.

Figure 6:
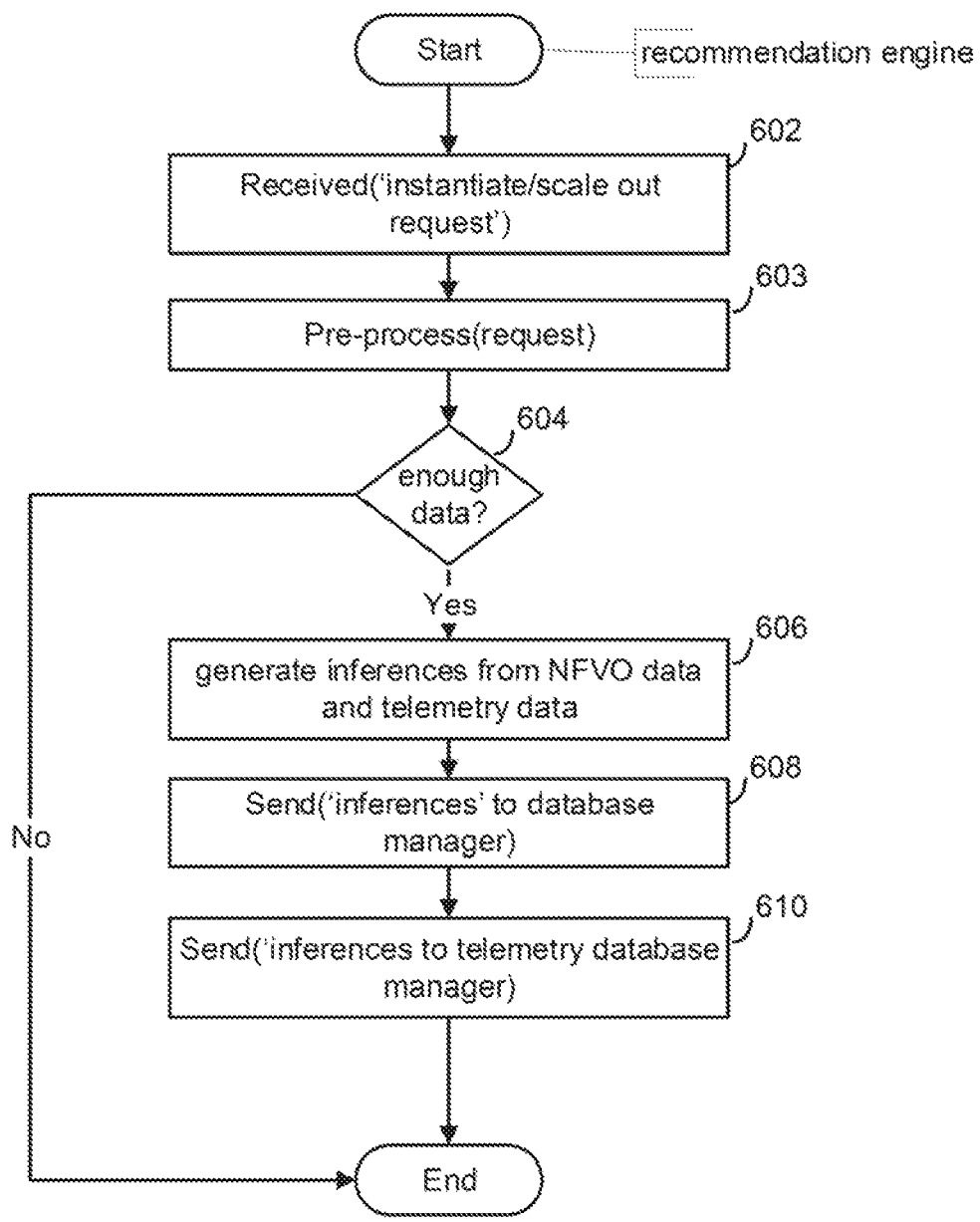
FIG. 6 depicts a flow of operations for the recommendation engine, according to an embodiment.

FIG. 6 depicts a flow of operations for the recommendation engine, according to an embodiment. In step 602, recommendation engine 306 receives a request to instantiate or scale out a VNF. In step 603, database manager 406 pre-processes the request. In step 604, recommendation engine 306 determines whether or not it has enough data to generate inferences from the NFVO data and the telemetry data. If so, then in step 606, recommendation engine 306 generates the inferences. In step 608, recommendation engine 306 sends the inferences to database manager 406. In step 610, recommendation engine 306 sends the inferences to telemetry database manager 408.

Figure 7:
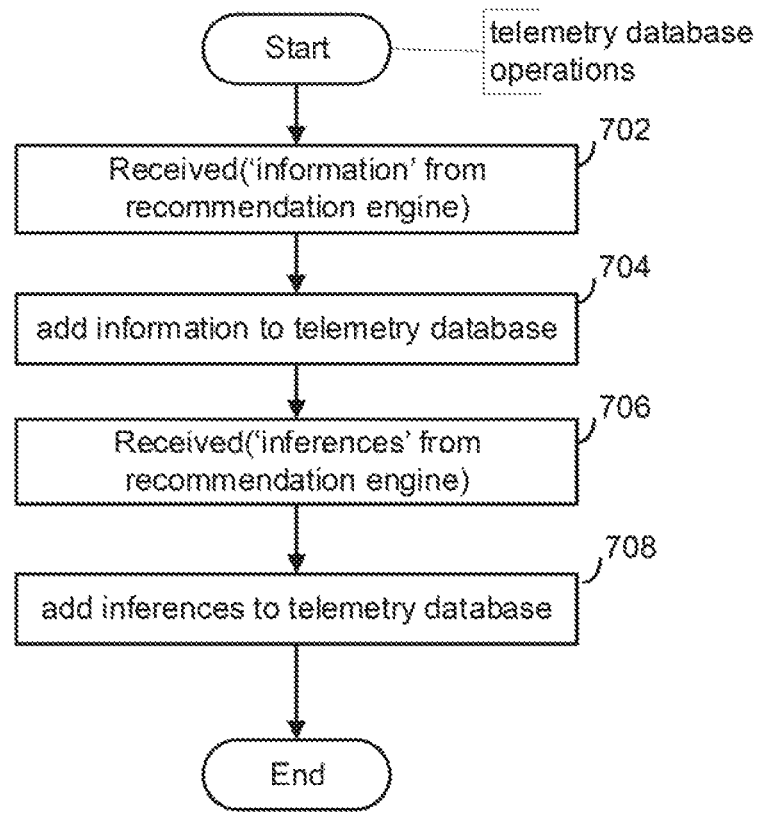
FIG. 7 depicts a flow of operations for the telemetry database manager, according to an embodiment.

FIG. 7 depicts a flow of operations for the telemetry database manager, according to an embodiment. In step 702, telemetry database manager 408 receives information from recommendation engine 306. The information is similar to the key, value data depicted in FIG. 9B, but limited to the data that pertains when the type in 966 is 'similar' or 'pattern.' In step 704, telemetry database manager 408 adds the information to telemetry database 404. In step 706, telemetry database manager 408 receives inferences from recommendation engine 306. In step 708, telemetry database manager 408 adds the inferences to telemetry database 404.

Figure 8:
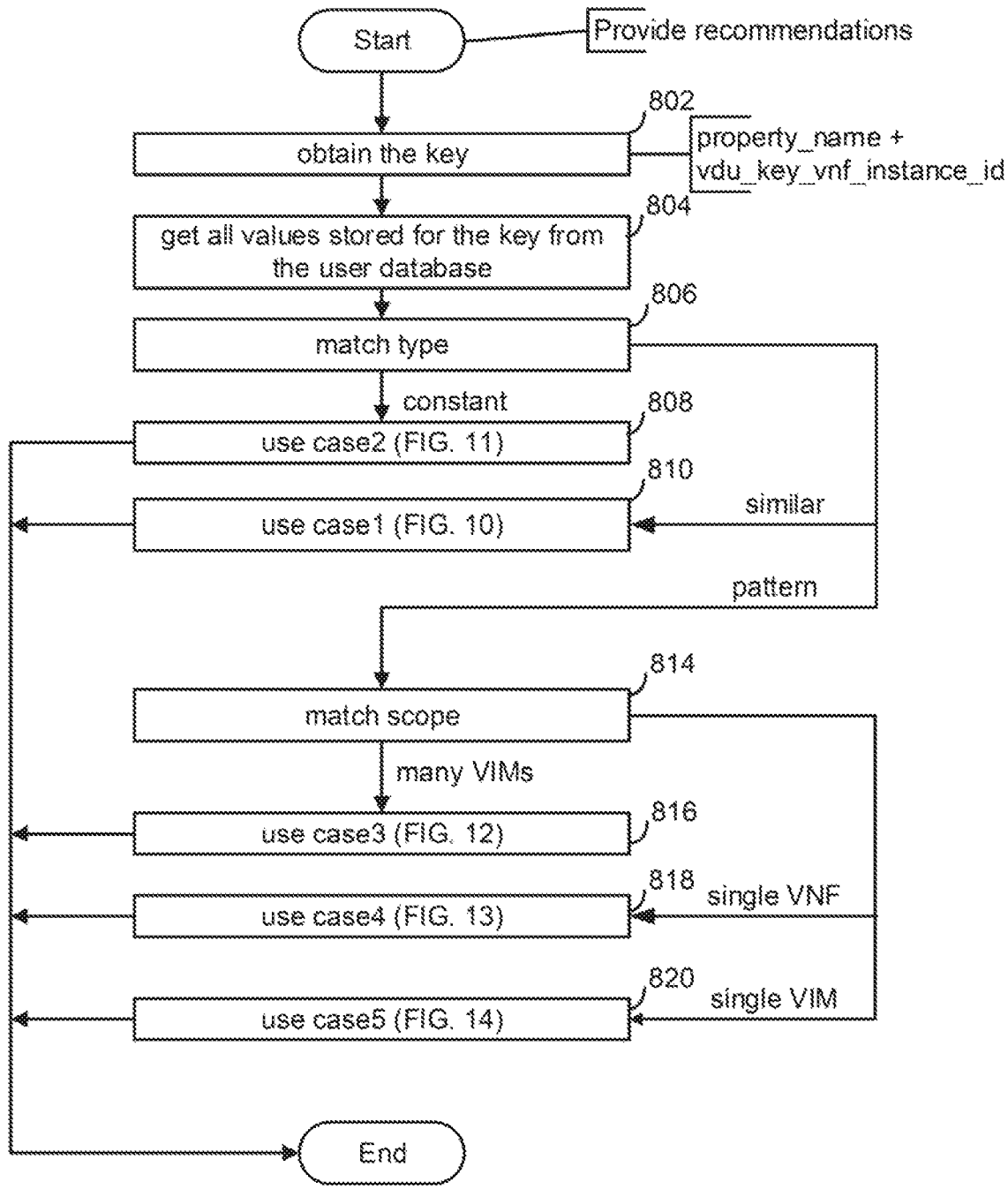
FIG. 8 depicts a flow of operations of the recommendation engine for providing recommendations according to an embodiment.
Figure 10:
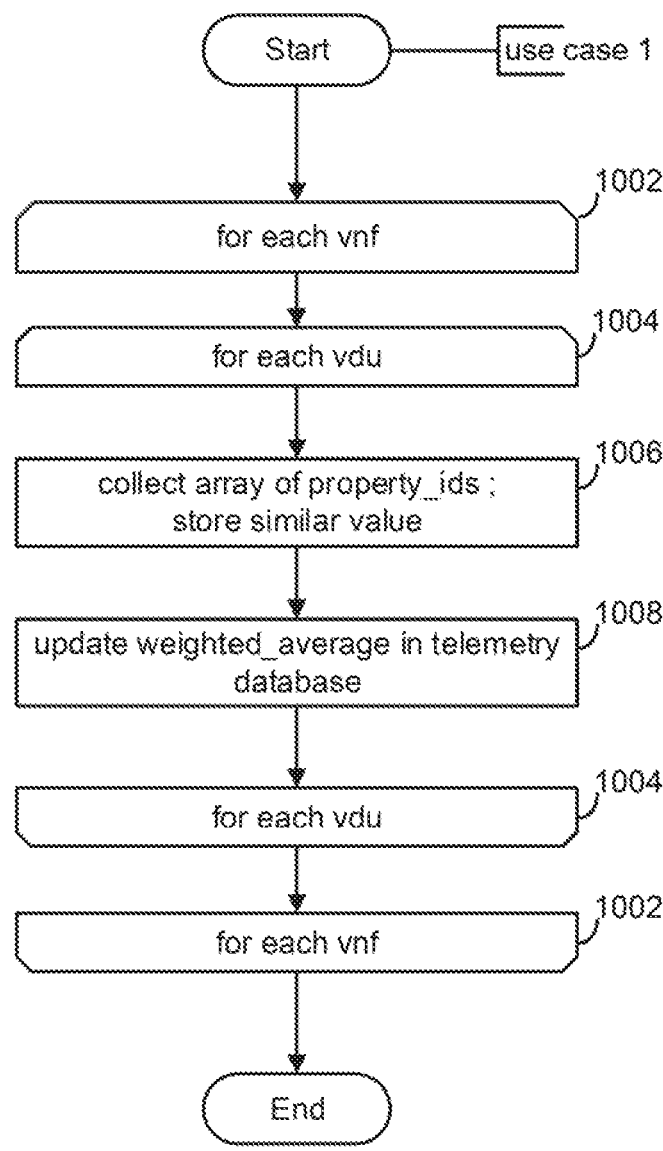
FIGS. 10-14 describe flows of operations for generating inferences for several use cases based on the values corresponding to a key in the user database.
Figure 11:
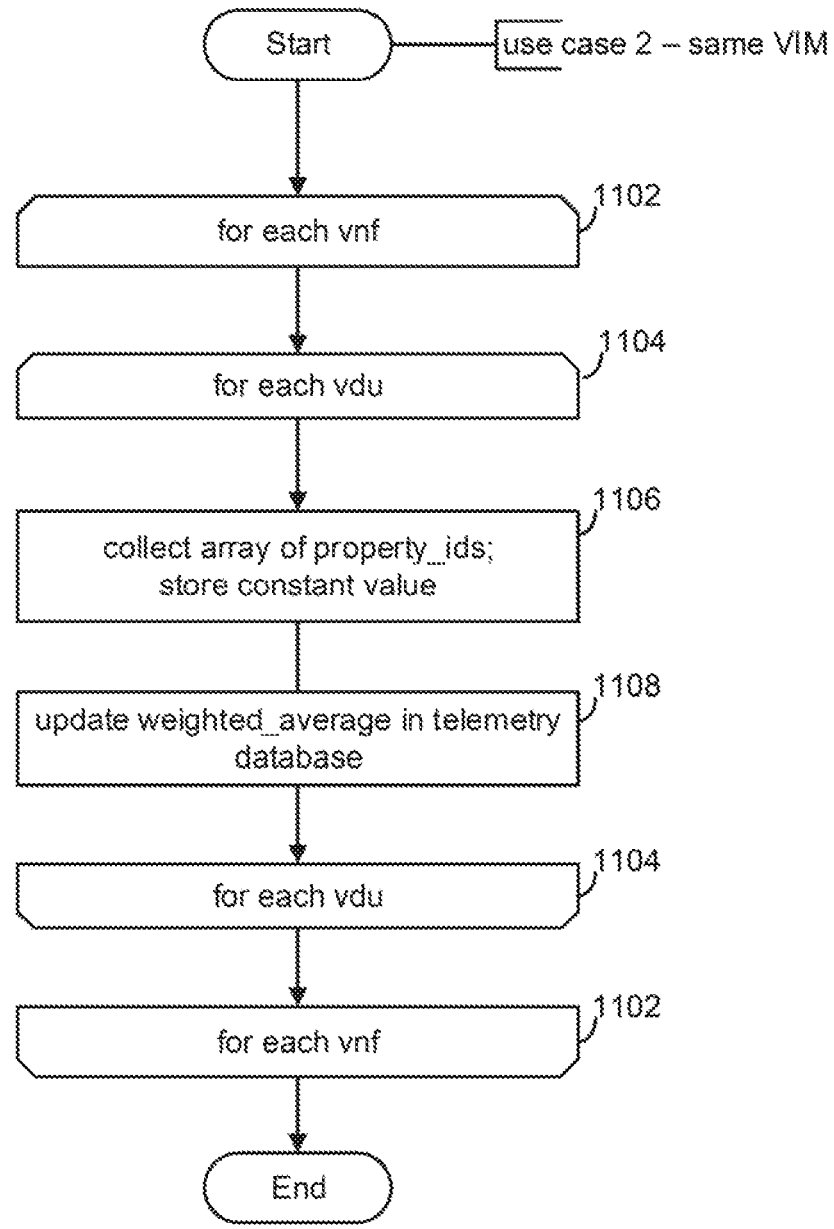
Figure 12:
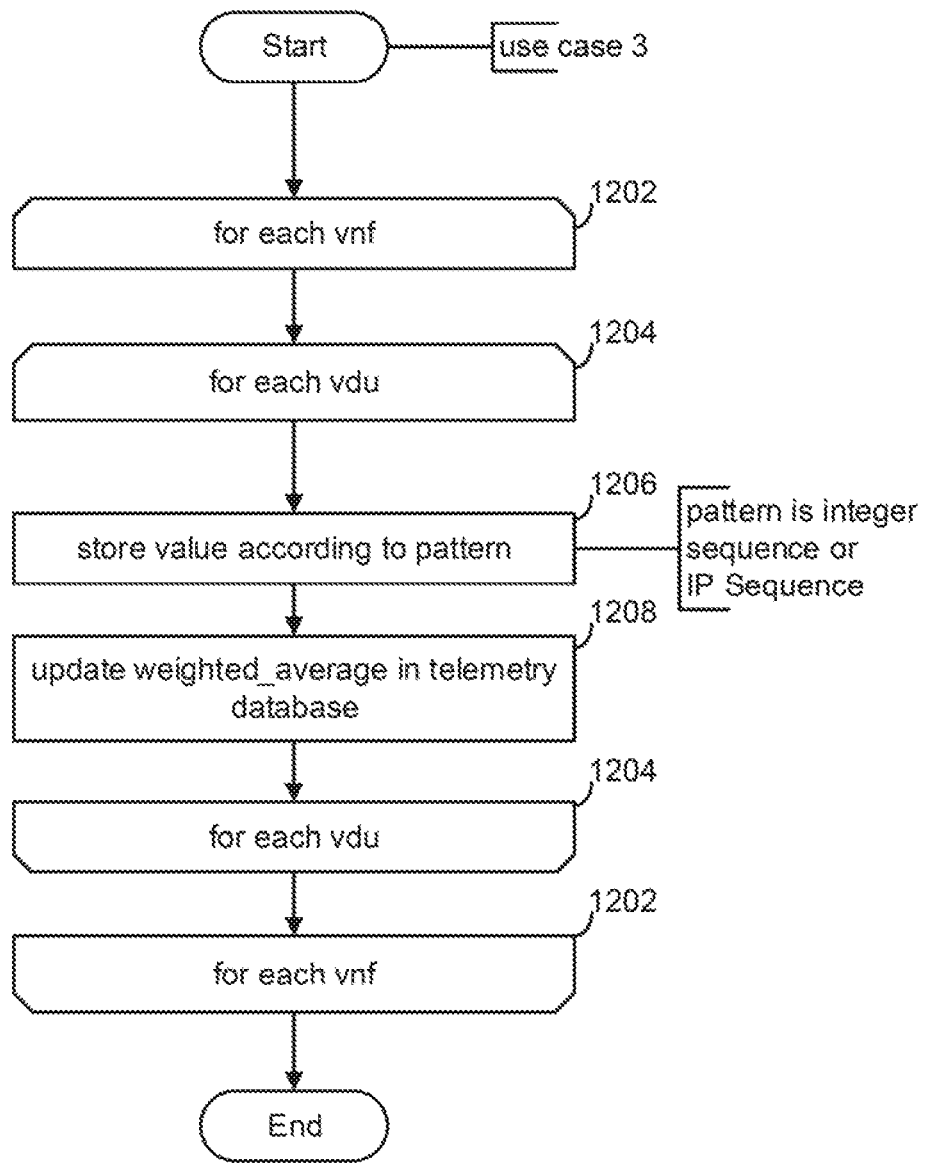
Figure 13:
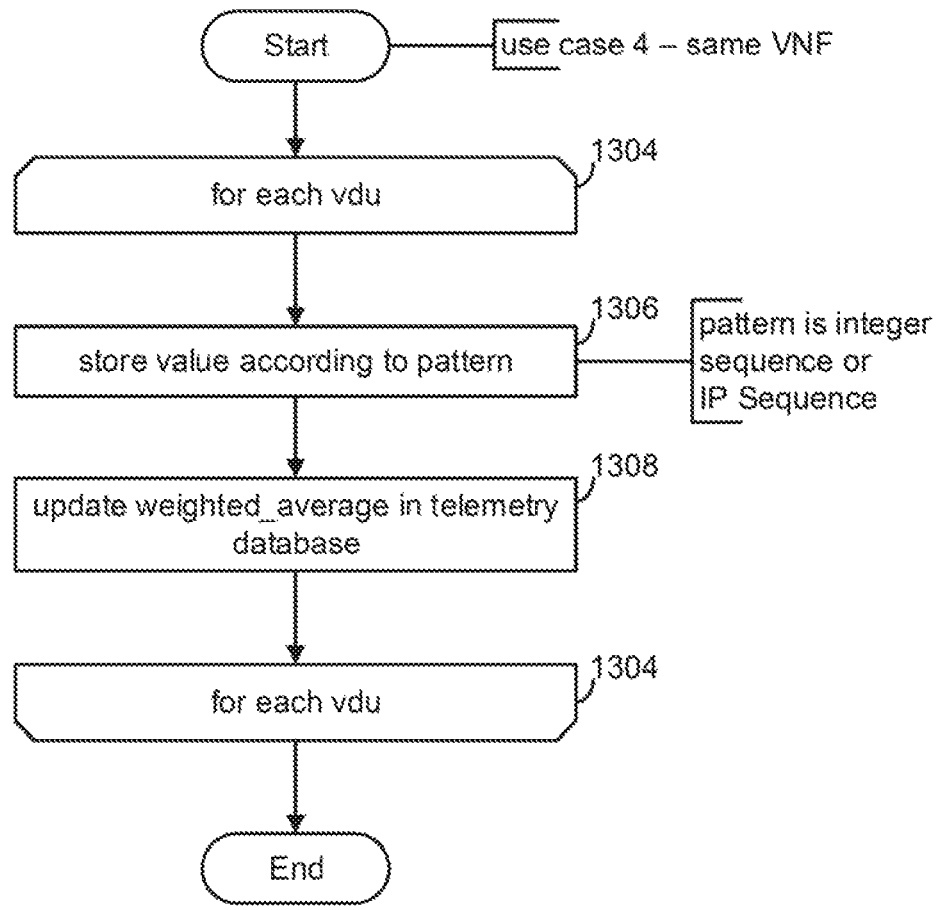
Figure 14:
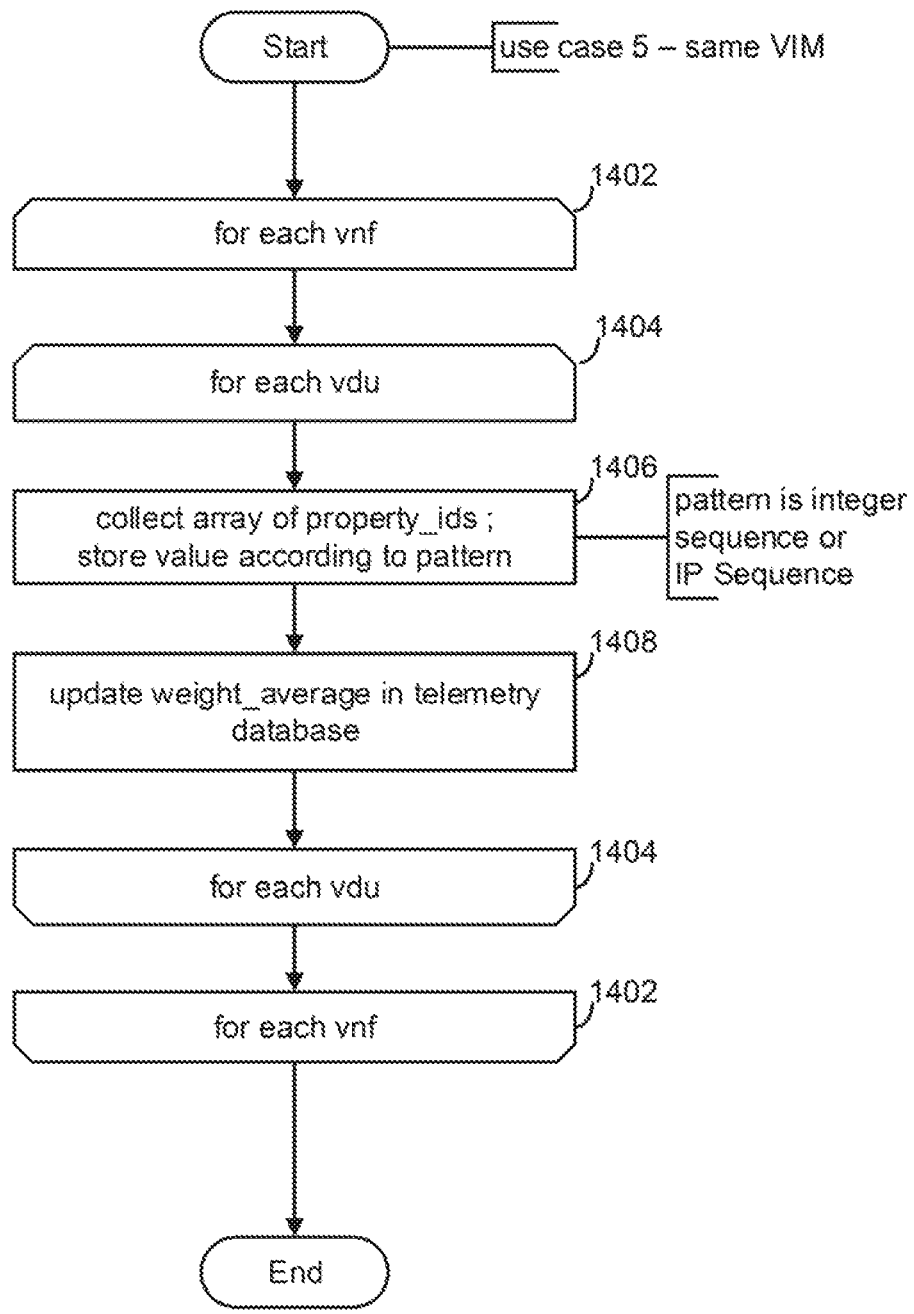

FIG. 8 depicts a flow of operations of the recommendation engine for providing recommendations. In step 802, recommendation engine 306 obtains the key for a look-up into user database 402. In step 804, recommendation engine 306 gets all values stored in user database 402 for the key. In step 806, recommendation engine 306 determines the types of the values by matching the type of each value. In step 808, recommendation engine 306 processes the values that are of a constant type, where the processing is depicted in FIG. 11. In step 810, recommendation engine 306 processes values that are of a similar type, where the processing is depicted in FIG. 10. In step 814, recommendation engine 306 processes patterns according to their scope. Patterns whose scope is many VIMs are processed in step 816, where the processing is depicted in FIG. 12. Patterns whose scope is that of a single VNF are processed in step 818, where the processing is depicted in FIG. 13. Patterns whose scope is that of a single VIM are processed in step 820, where the processing is depicted in FIG. 14.

Figure 9A:
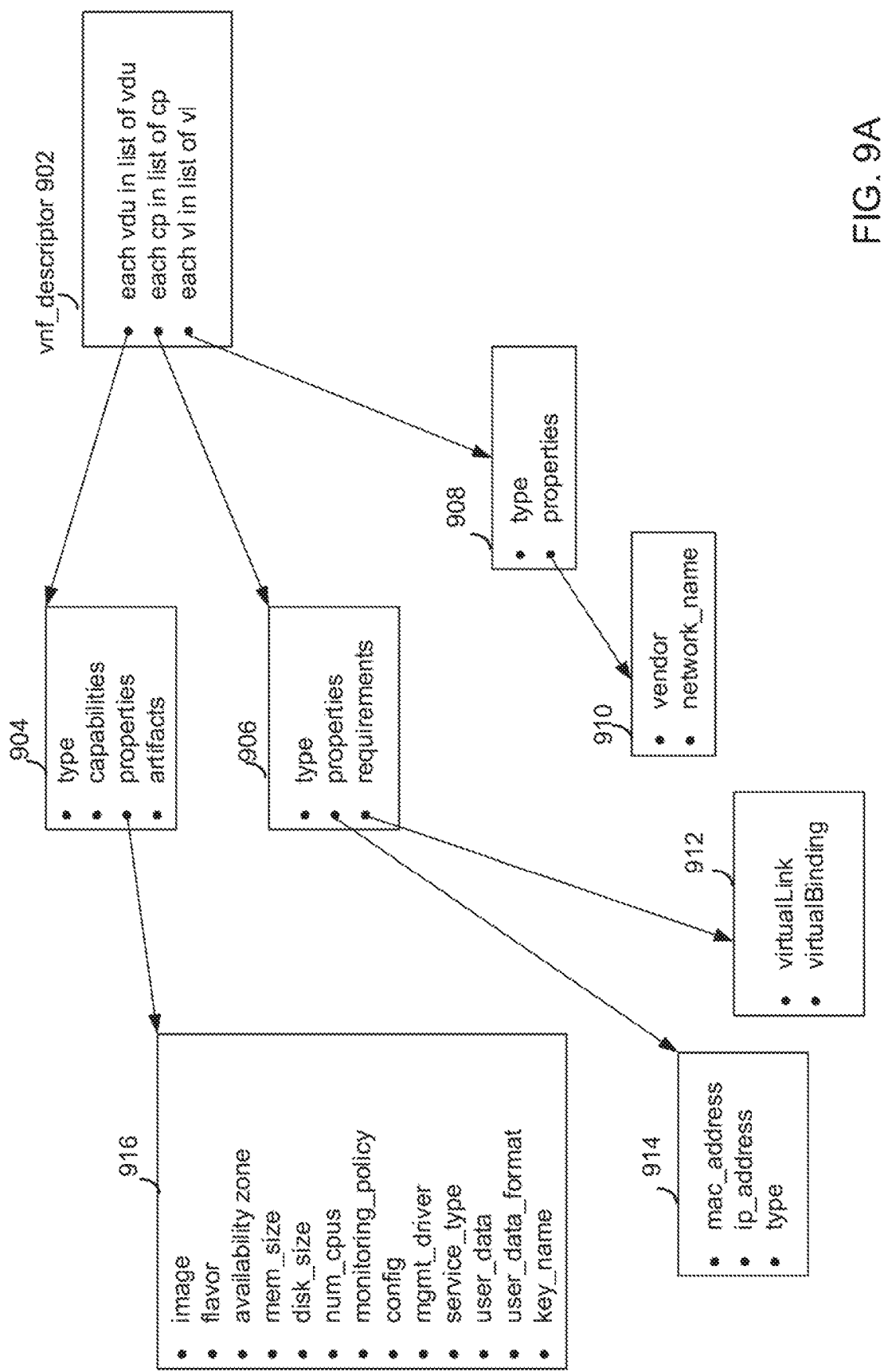
FIG. 9A depicts the structure of a VNF descriptor.

FIG. 9A depicts the structure of a VNF descriptor 902, vnf descriptor, which is a data structure that includes one or more VDUs, one or more connection points, and one or more virtual link fields. VNF descriptor 902 provides information regarding (a) the component composition of the VNF and (b) how components of a VNF are interconnected and (c) how a VNF in a network node is connected to other network nodes in the system via virtual connection points and virtual links. In VNF descriptor 902, each vdu field includes the type, capabilities, properties, and artifacts of the vdu, as depicted in structure 904. The properties of a vdu field include image, flavor, availability zone, mem_size, disk_size, num_cpus, monitoring_policy, config, mgmt_driver, service_type, user_data, user_data_format, and key_name as depicted in structure 916. Each connection point (cp) field includes the type, properties, and requirements of the connection point, as depicted in structure 906. Properties in the connection point field include the mac_address, ip_address, and a type as depicted in structure 914. Requirements in the connection point field include virtualLink and virtualBinding, as depicted in structure 912. Each virtual link field includes the type and properties of the virtualLink, as depicted in structure 908. The properties of the virtual link field include a vender and a network_name as depicted in structure 910.

Figure 9B:
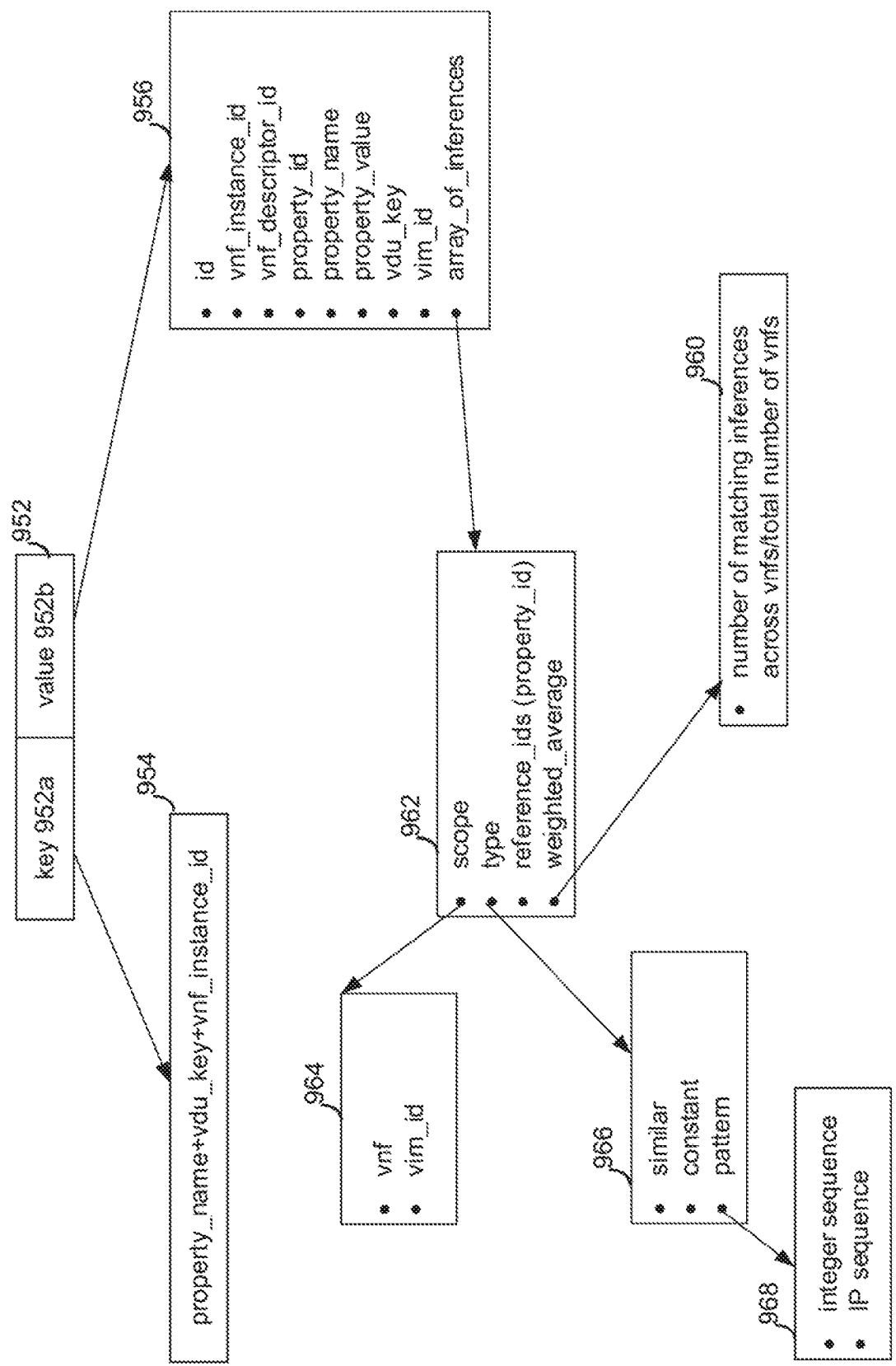
FIG. 9B depicts the structure of a key-value pair in the database.

FIG. 9B depicts the structure of a key-value pair in user database 402. The key-value pair 952 includes key 952a for performing a look-up in user database 402. Key 952a is the concatenation of the property_name, the vdu_key, and the vnf_instance_id, as depicted in structure 954. Values 952b include an id, a vnf_instance_id, a vnf_descriptor_id, a property_id, a property_name, a property_value, a vdu_key, a vim_id, and an array_of_inferences, as depicted in structure 956 and set forth in Table 1.

TABLE 1

| \multicolumn{2}{c}{Value names corresponding to a key} | |
| --- | --- |
| id | a unique identifier to identify the record in the NFVO |
| vnf_instance_id | the identifier of the vnf_instance |
| vnf_descriptor_id | the identifier of the vnf_descriptor |
| property_id | a unique value to identify a property in the vnf_descriptor. This value is the same for different vnf_instances of the same vnf_descriptor for the given property name and is equivalent to vdu_key + vnf_descriptor_id |
| property_name | the name of a configurable property |
| property_value | the value of a configurable property |
| vdu_key | the name of a vdu in the vnf_descriptor |
| vim_id | the identifier of a VIM |
| array_of_inferences | an array containing inferences by the recommendation engine |

The array of inferences includes a scope, a type, reference ids (property_ids) and a weighted average, as depicted in structure 962. The scope field in the array includes either VNF or vim_id, as depicted in structure 964. The type field in the array includes similar, constant, or pattern as depicted in structure 966. The pattern field includes integer sequence or IP sequence, as depicted in structure 968. The weighted_average is the number of matching inferences across vnfs divided by the total number of vnfs, as depicted in structure 960. Structures 956, 960, 962, 965, 966, and 968 are updated according to the flow of operations depicted in FIG. 8.

FIGS. 10-14 describe flows of operations for generating inferences for several use cases based on the values corresponding to a key in the user database.

FIG. 10 depicts a flow of operations for use case 1. In step 1002, an iterator runs over each VNF to be deployed over any number of VIMs. In step 1004, another iterator iterates over each vdu for the VNF. In step 1006, an array of property_ids is collected so that each can be given the same property value. In addition, in step 1008, the weighted_average is updated in telemetry database 404, using the key vdu_key+vnf_descriptor_id.

FIG. 11 depicts a flow of operations for use case 2. In step 1102, an iterator iterates over each VNF to be deployed to a single VIM. In step 1104, an iterator iterates over each vdu. In step 1106, an array of property_ids is collected so that each in step 1106 can be given a constant property value. For example, a constant property value is a directory name server (DNS), a network time protocol (NTP), or an element management system (EMS) IP address. The scope of the recommendation is within a particular VIM. That is, each VNF and each vdu considered for recommended values in the flow operations pertain only to the single VIM, such as VIM 252a or VIM 252b or VIM 256c. In step 1108, the weighted_average is updated in the telemetry database 404.

FIG. 12 depicts a flow of operations for use case 3. In step 1202, an iterator runs over each VNF to be deployed over any number of VIMs. In step 1204, an iterator runs over the vdus of the current VNF. In step 1206, a pattern is obtained for any common keys so that the next increment in the pattern can be assigned to the value of a property_id. The scope of the recommendation is set to the VNF. That is, each vdu considered for recommended values in the flow of operations pertains only to the particular VNF of the iterator in step 1202. Also, the weighted_average is updated in step 1208 in telemetry database 404.

FIG. 13 depicts a flow of operations for use case 4. In step 1304, an iterator runs over the vdus of a particular VNF to be deployed over any number of VIMs. In step 1306, an array of property_ids is collected, and a pattern is determined among the property_ids in the array so that the next increment in the pattern can be assigned in step 1306 the value of a property_id. The scope of the recommendation is the VNF. That is, each vdu considered for recommendation values in the flow of operations pertains only to the one particular VNF. Also, the weighted_average is updated in step 1308 in telemetry database 404.

FIG. 14 depicts a flow of operations for use case 5. In step 1402, an iterator runs over the VNFs to be deployed to a single VIM. In step 1404, an iterator runs over each vdu. In step 1406, an array of property_ids is collected, and a pattern is determined among the property_ids in the array so that the next increment in the pattern can be assigned to the value of the property_id. The scope of the recommendation is the VIM. That is, each vdu and each VNF considered for recommendation values pertains only to the single VIM, such as VIM 252a or VIM 252b or VIM 256c. Also, the weighted_average is updated in step 1408 in telemetry database 404.

In one example, one popular VNF is the vEPC VNF, which contains six VMs and is widely deployed across different telecom vendors. Two of the VMs are management plane VDUs. Another two of the VMs are control plane VDUs, and another two are data plane VDUs. In this example, the management plane VDU was deployed as many as 22 times in using the same VNF instantiation data in the same infrastructure, two times using other vendor VNF instantiation data and 20 times using telemetry data of the same VNF in a different infrastructure.

The control plane VDU was deployed 15 times using the same VNF instantiation data in the same infrastructure, one time using other vendor VNF instantiations in the same infrastructure and 13 times using telemetry data of the same VNF in a different infrastructure.

The data plane VDU deployed 15 times using the same VNF instantiation data in the same infrastructure, one time using other vendor VNF instantiations in the same infrastructure and 13 times using telemetry data of the same VNF in a different infrastructure.

Thus, by having the recommendation provide suggestions using telemetry and inventory data, management of the lifecycle operations for the user is made less-error prone and more accurate. General operations, like, auto-scale out are greatly simplified because the user does not need to provide input parameters for this operation. Moreover, no external plug-ins are needed in third party systems like EMS, which call VNF Manager APIs to manage the life cycle operations with this data.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general-purpose computer selectively activated or configured by a computer program stored in the computer. In particular, various general-purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system. Computer readable media may be based on any existing or subsequently developed technology for embodying computer programs in a manner that enables them to be read by a computer. Examples of a computer readable medium include a hard drive, NAS, read-only memory (ROM), RAM (e.g., flash memory device), Compact Disk (e.g., CD-ROM, CD-R, or CD-RW), Digital Versatile Disk (DVD), magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention. In general, structures and functionalities presented as separate components in exemplary configurations may be implemented as a combined structure or component. Similarly, structures and functionalities presented as a single component may be implemented as separate components. These and other variations, modifications, additions, and improvements may fall within the scope of the appended claims.

What is claimed is:

1. A method for deploying a virtual network function (VNF) in a network virtualization infrastructure, the method comprising:
    receiving a request to instantiate the VNF in one or more of a plurality of data centers, each of which includes a local control plane and a virtualization infrastructure manager (VIM);
    obtaining inputs from a user providing parameters needed for performing the instantiation of the VNF;
    determining a type of deployment for the VNF, wherein a number of instances of the VNFs to be deployed and a number of VIMs that will be instructed to deploy resources needed by the VNF are determined based on the type of deployment;
    adding parameters inferred from the type of deployment to the user parameters to complete parameters needed to deploy the VNF, wherein the added parameters are inferred based on stored data regarding previous instantiations of the VNF; and
    issuing commands to the local control plane of one or more of the data centers to instantiate the VNF according to the parameters,
    wherein the VNF is instantiated in the one or more of the data centers according to the parameters in response to the commands.

2. The method of claim 1, wherein the type of deployment is one that instantiates the VNF multiple times in the VIM.

3. The method of claim 2, wherein stored data for each VNF refers to a VNF-specific constant property.

4. The method of claim 3, wherein the constant property is a directory name system (DNS) server, a network time protocol (NTP) server or an element management system (EMS) IP address.

5. The method of claim 2, wherein the stored data for each VNF has a pattern and adding parameters includes adding a parameter based on the pattern.

6. The method of claim 1, wherein the type of deployment is one that instantiates the VNF across multiple VIMs.

7. The method of claim 1, wherein the type of deployment is one that instantiates the VNF multiple times across each of multiple VIMs.

8. A system for deploying a virtual network function (VNF) in a network virtualization infrastructure, the system comprising:
    a plurality of data centers, each data center including a local control plane and a virtualization infrastructure manager (VIM);
    a user input database; and
    an orchestration server coupled to the user input database, wherein the orchestration server includes a processor that is configured to:
        receive a request to instantiate a VNF in the network virtualization infrastructure;
        obtain inputs from a user providing parameters for performing the instantiation of the VNF;
        determine a type of deployment for the VNF, wherein a number of instances of the VNFs to be deployed and a number of VIMs that will be instructed to deploy resources needed by the VNF are determined based on the type of deployment;
        add parameters inferred from the type of deployment to the user parameters to complete parameters needed for deployment of the VNF, wherein the added parameters are inferred based on data stored in the user input database regarding previous instantiations of the VNF; and
        issue commands to the local control plane of one or more of the data centers to instantiate the VNF according to the parameters,
    wherein the VNF is instantiated in the one or more of the data centers according to the parameters in response to the commands.

9. The system of claim 8, wherein the type of deployment is one that instantiates the VNF multiple times in the VIM.

10. The system of claim 9, wherein stored data for each VNF refers to a VNF-specific constant property.

11. The system of claim 10, wherein the constant property is a directory name system (DNS) server, a network time protocol (NTP) server or an element management system (EMS) IP address.

12. The system of claim 9, wherein the stored data for each VNF has a pattern and adding parameters includes adding a parameter based on the pattern.

13. The system of claim 8, wherein the type of deployment is one that instantiates the VNF across multiple VIMs.

14. The system of claim 8, wherein the type of deployment is one that instantiates the VNF multiple times across each of multiple VIMs.

15. A non-transitory computer-readable medium comprising instruction executable in a computer system, wherein the instructions when executed in the computer system cause the computer to carry out a method for deploying a virtual network function (VNF) in a network virtualization infrastructure, the method comprising:

receiving a request to instantiate the VNF in one or more of a plurality of data centers, each of which includes a local control plane and a virtualization infrastructure manager (VIM);

obtaining inputs from a user providing parameters needed for performing the instantiation of the VNF;

determining a type of deployment for the VNF, wherein a number of instances of the VNFs to be deployed and a number of VIMs that will be instructed to deploy resources needed by the VNF are determined based on the type of deployment;

adding parameters inferred from the type of deployment to the user parameters to complete parameters needed to deploy the VNF, wherein the added parameters are inferred based on stored data regarding previous instantiations of the VNF; and issuing commands to the local control plane of one or more of the data centers to instantiate the VNF according to the parameters, wherein the VNF is instantiated in the one or more of the data centers according to the parameters in response to the commands.

16. The non-transitory computer-readable medium of claim 15, wherein the type of deployment is one that instantiates the VNF multiple times in the VIM.

17. The non-transitory computer-readable medium of claim 16, wherein stored data for each VNF refers to a VNF-specific constant property.

18. The non-transitory computer-readable medium of claim 16, wherein the stored data for each VNF has a pattern and adding parameters includes adding a parameter based on the pattern.

19. The non-transitory computer-readable medium of claim 15, wherein the type of deployment is one that instantiates the VNF across multiple VIMs.

20. The non-transitory computer-readable medium of claim 15, wherein the type of deployment is one that instantiates the VNF multiple times across each of multiple VIMs.

* * * * *